United States Patent [19]

Ishida

[11] Patent Number: 5,172,287

[45] Date of Patent: Dec. 15, 1992

[54] MAGNETIC DISC APPARATUS HAVING UNIFORM TORQUE IMPARTING MEANS FOR IMPARTING UNIFORM TORQUE IRRESPECTIVE OF ROTATIONAL POSITION OF A HEAD ARM

[75] Inventor: Katsuaki Ishida, Nagano, Japan

[73] Assignee: Fujitsu Limited, Kawasaki, Japan

[21] Appl. No.: 780,569

[22] Filed: Oct. 22, 1991

Related U.S. Application Data

[63] Continuation-in-part of Ser. No. 493,647, Mar. 15, 1990, abandoned.

[30] Foreign Application Priority Data

Mar. 17, 1989 [JP] Japan ................. 1-65496

[51] Int. Cl.$^5$ .................... G11B 5/54; G11B 5/596
[52] U.S. Cl. .................... 360/105; 360/106; 360/78.06; 360/78.12
[58] Field of Search ............ 360/105, 106, 75, 77.02, 360/77.04, 77.05, 77.06, 78.06, 78.12, 97.01

[56] References Cited

U.S. PATENT DOCUMENTS 4,331,991 5/1982 Morehouse et al. ............. 360/106
4,807,062 2/1989 Onodera ..................... 360/105 X

FOREIGN PATENT DOCUMENTS 5479 1/1985 Japan.
244266 10/1987 Japan.

OTHER PUBLICATIONS

IBM Technical Disclosure Bulletin, vol. 4, No. 6 Nov. 1961, Actuator, Kochenburger.

Primary Examiner—Andrew L. Sniezek
Attorney, Agent, or Firm—Armstrong & Kubovcik

[57] ABSTRACT

A swing head arm type magnetic disc apparatus includes a magnetic disc having a data R/W zone and a CSS zone, and is accommodated in a housing and a spindle rotably supported on the housing, a head arm provided with a floating-type magnetic head and secured to the spindle, a motor for driving the spindle when a seek operation is performed, and apparatus for imparting torque to the spindle. The torque imparting apparatus imparts torque such that the total torque obtained by summing up torque provided by a head arm and the torque by the torque imparting apparatus itself is made uniform irrespective of rotational position of a head arm, and acts in a direction which causes the magnetic head to move toward the CSS zone.

4 Claims, 5 Drawing Sheets

MAGNETIC DISC APPARATUS HAVING UNIFORM TORQUE IMPARTING MEANS FOR IMPARTING UNIFORM TORQUE IRRESPECTIVE OF ROTATIONAL POSITION OF A HEAD ARM

This application is a continuation-in-part of application Ser. No. 493,647 filed Mar. 15, 1990 now abandoned.

BACKGROUND OF THE INVENTION

The present invention relates to a magnetic disc apparatus, and more particularly to a magnetic disc apparatus having swing head arms.

Recently, with the advances made in high density recording, a magnetic disc apparatus has been required to have much higher reliability.

In a magnetic disc apparatus of a type having a swing head arm, the following is required.

(1) To prevent any damage to data recorded, a magnetic head of a floating type should not come into contact with a read and write zone on a magnetic disc.

(2) To perform a seek operation in a stable manner, the load counter to swing a head arm about a center shaft should be constant, irrespective of rotational positions thereof.

Japanese Laid-Open Patent Applications No.60-5479 and No.62-244266 respectively disclose magnetic disc apparatuses of a swing head arm type which are adapted so that, when electric power is shut off unexpectedly during a read/write mode, a head arm is turned thereby to shift a magnetic head to a contact start stop zone on a magnetic disc.

Since the magnetic head is returned rapidly to the contact start stop zone, the magnetic head does not come into contact with a read and write zone on the magnetic disc, and thereby any data damage can be prevented.

Generally, the swing head arm has moment of force due to deviation of the center of gravity of the head arm itself with respect to a center shaft. Further, on the swing head arm a force of wind acts generated due to high speed rotation of the magnetic disc and the resilience force of a flexible print circuit connected to the head arm.

Accordingly, moment of force of the head arm is not constant but varies depending on the rotational position thereof.

The above magnetic disc apparatuses of Japanese Laid-Open Patent Applications No.60-5479 and No.62-244266 are not of a construction wherein moment of force of the head arm is made constant irrespective of rotational position thereof.

Therefore, in order to perform a seek operation at a predetermined velocity, it becomes necessary to control the level of a bias current fed to a motor for driving the head arm so as to vary the bias current according to the rotational position of the head arm. Accordingly, control of the motor for the head arm becomes inevitably complicated.

SUMMARY OF THE INVENTION

Accordingly, it is a general object of the present invention to provide a novel and useful magnetic disc apparatus in which the problems described heretofore are eliminated.

Another and more specific object of the present invention is to provide a magnetic disc apparatus, in which a torque imparting device is provided so that torque acting on a shaft of a head arm is in the direction of the moving of the magnetic head toward the contact start stop zone, and also made uniform irrespective of the rotational position of the head arm.

Accordingly, in the present invention, it is possible to return the magnetic head to the contact start stop zone on the magnetic disc whereupon electric power is shut off unexpectedly, and also to carry out control of the motor for a seek operation in a simple manner.

Other objects and further features of the present invention will be apparent from the following detailed description when read in conjunction with the accompanying drawings.

DESCRIPTION OF THE PREFERRED EMBODIMENTS

Figure 1:
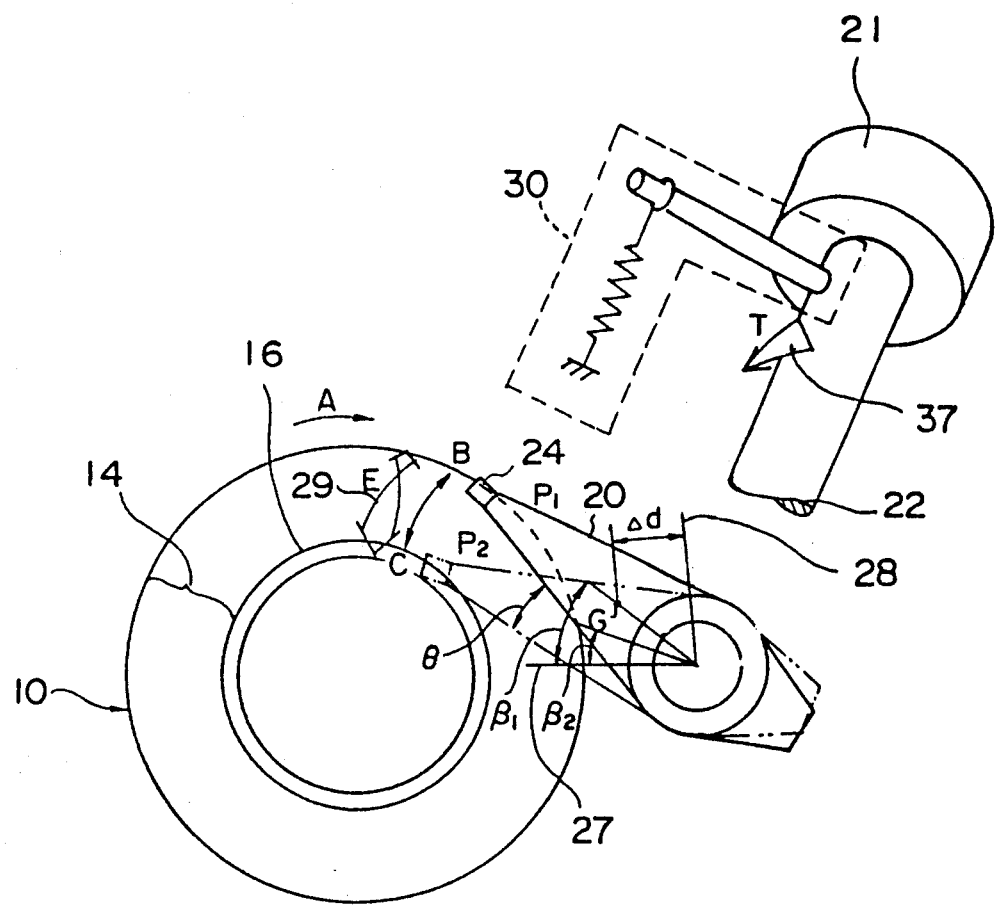
FIG. 1A is a schematic view of a first embodiment of a magnetic disc apparatus according to the present invention.
FIG. 1B is a perspective view of a spindle of a voice coil motor according to the invention.

Referring to FIGS. 1A to 3, a magnetic disc 10 is mounted on a spindle 11 of a disc motor 12, and is accommodated in a housing 13 in a vertical state. The magnetic disc 10 is driven by the disc motor 12 to rotate at high speed in the direction indicated by an arrow A.

The magnetic disc 10 has two read and write (abbreviated "R/W" hereinafter) zones 14 and 15, and two contact start stop (abbreviated "CSS" hereinafter) zones 16 and 17 which are respectively disposed at the inner periphery of the R/W zones 14 and 15.

A swing head arm 20 is mounted on a carriage 23 which is secured to a spindle 22 of a voice coil motor (VCM) 21.

On the head arm 20, are provided floating-type magnetic heads 24 and 25 which are respectively adapted to read and write data in the R/W zones 14 and 15.

Ribbon wires 26 for transmitting signals are made of flexible print circuit and connected at free ends thereof to the head arm 20.

In FIG. 1A, there is generally indicated a single R/W zone 14, a single CSS zone 16 and a single magnetic head 24.

In accordance with a supplied head seek signal, the VCM 21 is driven to swing the head arm 20 in a bidirection as indicated by arrows B and C. The magnetic heads 24 and 25 are thereby shifted in a radial direction of the magnetic disc 10, and are positioned on predetermined tracks respectively.

Figure 2:
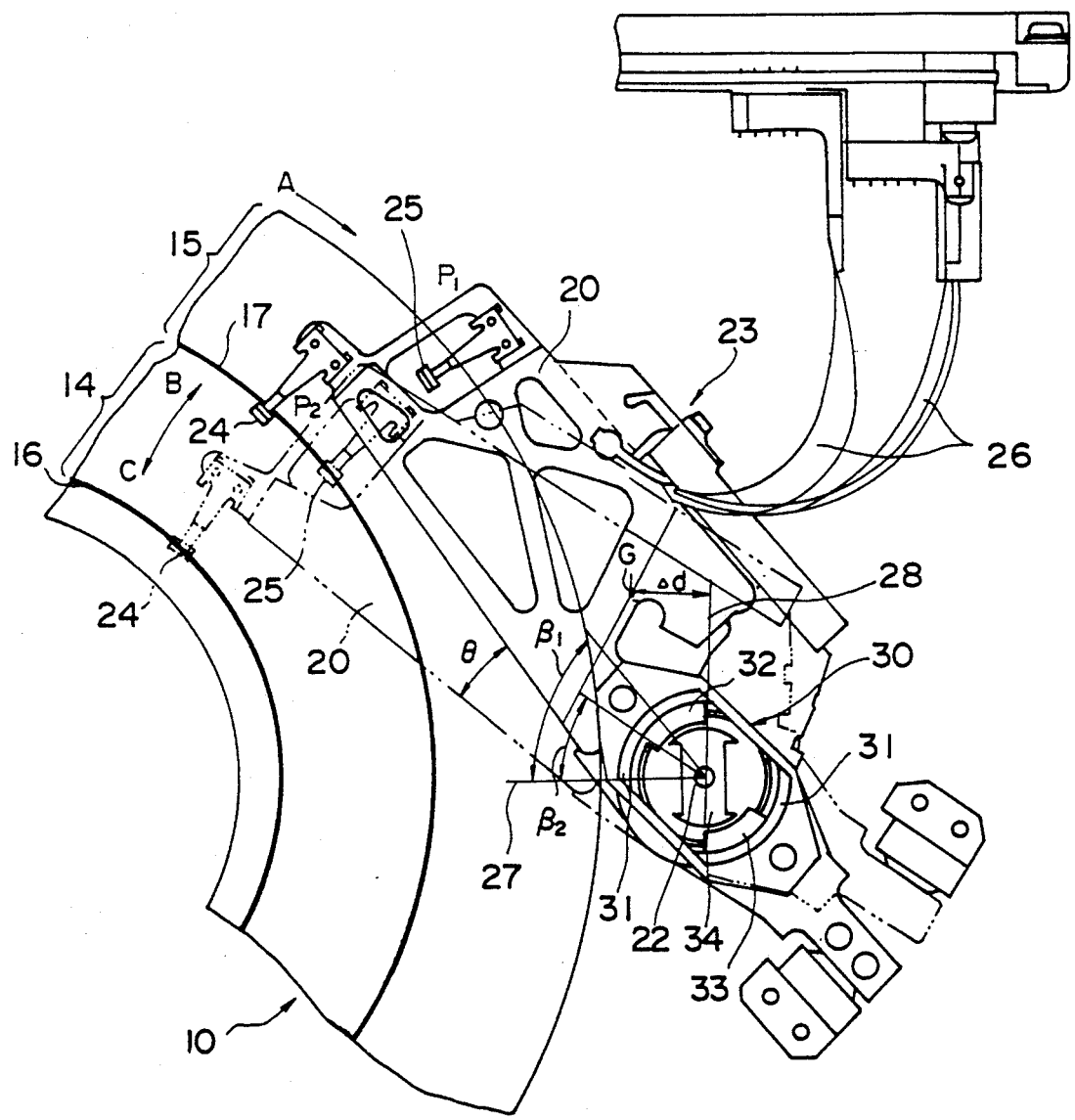
FIG. 2 is a side view indicating an essential part of a first embodiment of a magnetic disc apparatus according to the present invention.
Figure 3:
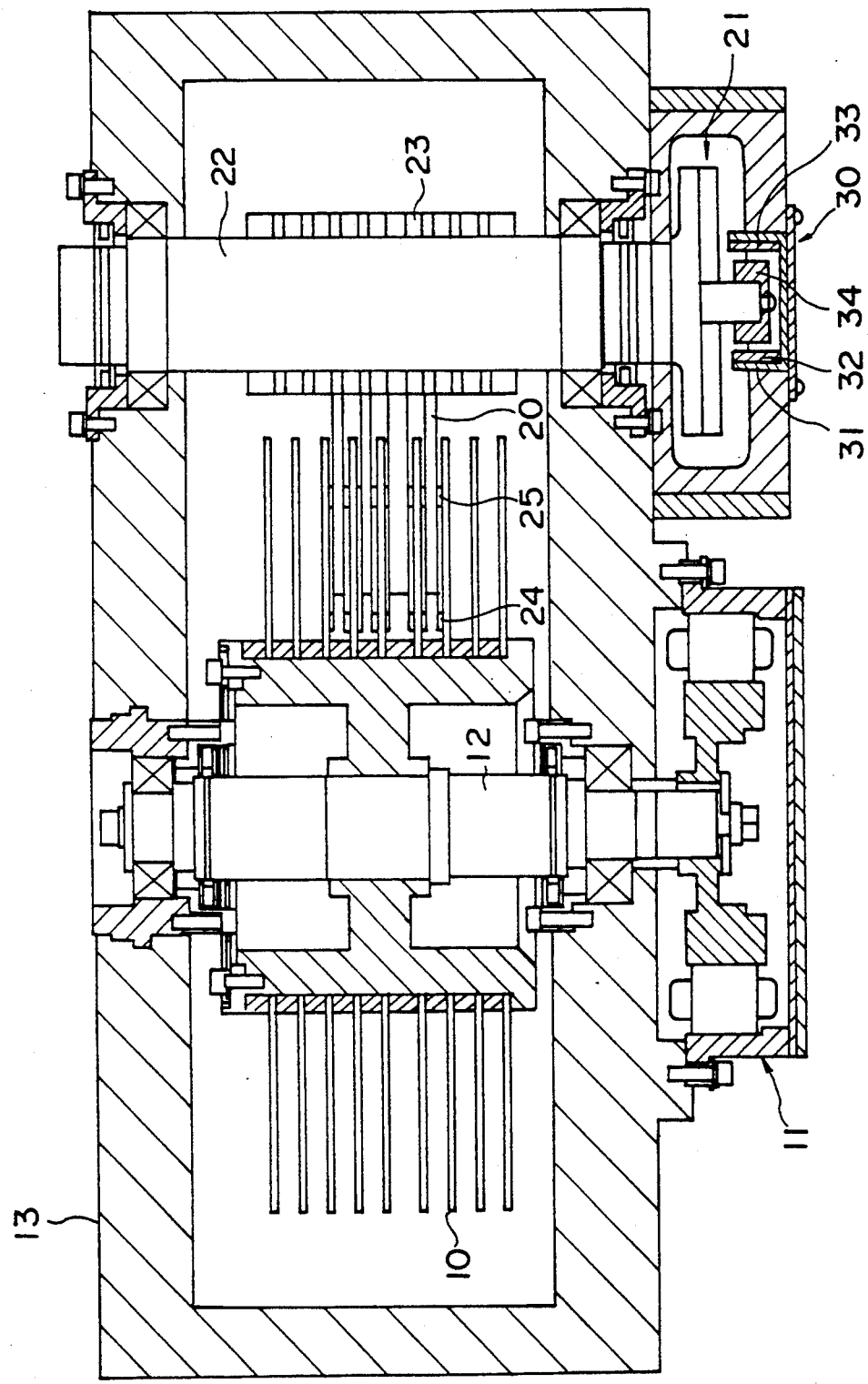
FIG. 3 is a plan view in transverse cross section generally indicating a first embodiment of a magnetic disc apparatus according to the present invention.

The head arm 20 swings over an angle $\theta$ between a first position $P_1$ where the magnetic heads 24 and 25 respectively confront the outer periphery of the R/W zones 14 and 15 as indicated by a continuous line in FIGS. 1 and 2, and a second position (return position) $P_2$ where the magnetic heads 24 and 25 respectively confront the CSS zones 16 and 17, as indicated by a chain double-dashed line in FIGS. 1 and 2.

Both angles $\beta_1$ and $\beta_2$ of the head arm 20 at the first and second positions thereof with respect to horizontal line 27 are at an angle of elevation.

In a state where a torque imparting device described hereinafter is removed, a torque which can be referred to hereafter as an operational torque is applied about the spindle 22 which varies as a result of angular displacement of the head arm 20, as follows. The head arm 20 has moment of force M, which is the sum of first, second and third sub-moment of force. The first sub-moments of force is generated due to some deviation $\Delta d$ of the center of gravity G of the head arm 20 with respect to a vertical line 28 passing through the center of the spindle 22, and acts in the counterclockwise direction in FIGS. 1A, 1B, and 2. The second sub-moment of force is due to the force of the wind generated by the high speed rotation of the magnetic disc 10, and acts in the clockwise direction in FIG. 2. The third sub-moment of force is due to the resilience force of the ribbon wires 26, and acts in the counterclockwise direction in FIG. 2.

The moment of force M imparts torque E to the spindle 22. The torque E becomes, for example, that indicated by a line I in FIG. 5.

Specifically, the torque E of the spindle 22 varies depending on the rotational position thereof, that is, depending on the rotational position of the head arm 20. As the head arm 20 swings toward the second position $P_2$, the torque E increases gradually and reaches a maximum at the second position $P_2$. At the first position $P_1$, the force of the wind acts effectively on the head arm 20, and the direction of torque is thereby reversed and goes in the clockwise direction.

A reference numeral 29 in FIG. 1A designates an arrow indicating the torque E, in which the arrow head represents the direction of torque E, and the width of the arrow represents the amount of torque E.

Outside of the housing 13 is provided a torque imparting device 30 which imparts a counter torque to the spindle 22, to oppose changes in the operational torque as a function of angular displacement of the head arm 20.

Figure 4:
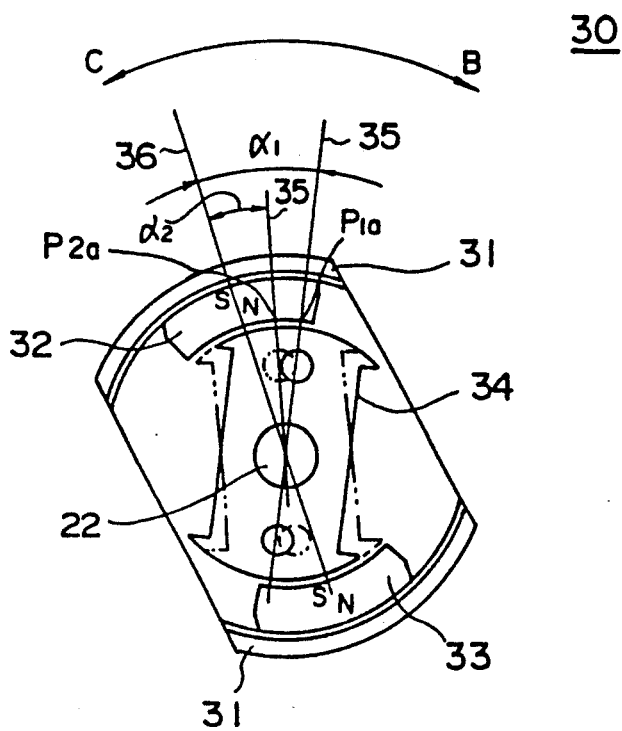
FIG. 4 is an enlarged view of a torque imparting device indicated in FIG. 2.

The device 30 includes, as further indicated in FIG. 4, a yoke 31 secured to the housing 13, permanent magnets 32 and 33 which are disposed so as to confront each other and mounted to the yoke 31, and an I-shaped rotor 34 which is secured at the end of the spindle 22 and is disposed inside the yoke 31.

The rotor 34 is rotated unitarily with the head arm 20. When the head arm 20 is located at the first position $P_1$ in FIG. 2, the rotor 31 is positioned at a first correspondence position $P_{1a}$ indicated by a continuous line in FIG. 4. When the head arm 20 is at the second position $P_2$ in FIG. 2, the rotor 30 takes a second correspondence position $P_{2a}$ indicated by a chain double-dashed line in FIG. 4.

The yoke 31 and the rotor 34 are disposed in a mutual positional relationship wherein, when the rotor 34 is located at the first correspondence position $P_{1a}$, a center line 35 of the rotor 34 is deviated by an angle $\alpha_1 (>\theta)$ in the clockwise direction with respect to a center line 36 passing through each center of the permanent magnets 32 and 33, and when the rotor 34 is located at the second correspondence position $P_{2a}$, the center line 35 of the rotor 34 is still deviated by an angle $\alpha_2 (<\alpha_1)$ in the clockwise direction with respect to the center line 36 of the permanent magnets 32 and 33.

In a space between the permanent magnets 32 and 33, is established a magnetic field, in which the rotor 34 is disposed, and magnetic moment S is thereby generated in the rotor 34 according to Coulomb's law on a magnetic pole.

Accordingly, on the rotor 34 is generated torque T as represented by the following formula.

$$T = H \cdot S \cdot \sin \alpha$$

wherein
H is magnitude of the magnetic field, and
$\alpha$ is angle of deviation of the center line 35 with respect to the center line 36.

The torque T thus generated acts so as to turn the head arm 20 in the counterclockwise direction in FIG. 4, that is, in the direction which causes the head arm 20 to swing toward the second position $P_2$.

The torque T is large when the angle $\alpha$ is $\alpha_1$, and decreases as the angle $\alpha$ decreases.

A reference numeral 37 in FIG. 1B designates an arrow indicating the torque T, in which the arrow head represents the direction of torque T, and the width of the arrow represents the amount of torque T.

This torque T is transmitted via the spindle 22 and the carriage 23 to the head arm 20.

Figure 5:
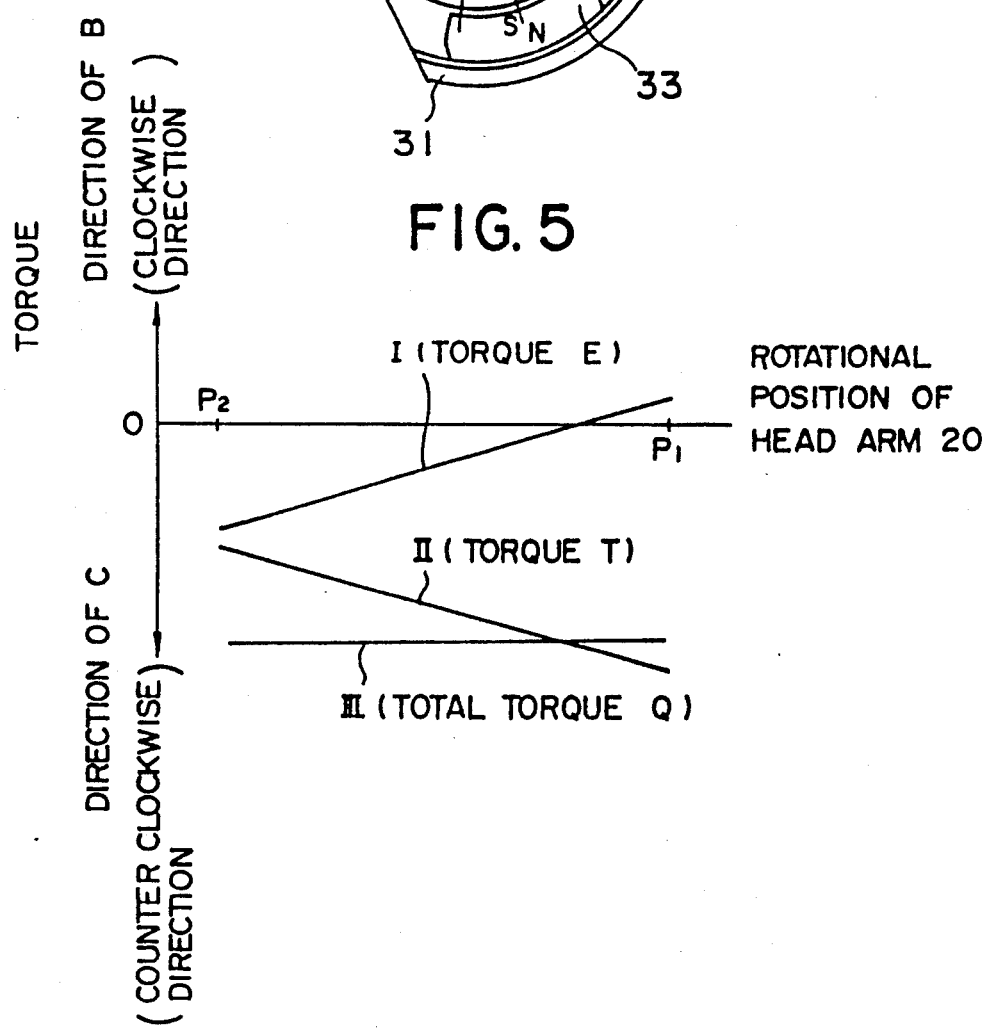
FIG. 5 is a diagram for explaining torque on a spindle of a head arm of the magnetic disc apparatus shown in FIG. 2.

The torque T is, for example, that indicated by a line II in FIG. 5.

As a result, on the spindle 22, that is, on the head arm 20, is imparted torque Q which is the sum of the torque E and the torque T described heretofore.

Since the torque E and the torque T are complementary to each other with respect to the rotational position of the head arm 20, the total torque Q becomes as indicated by line III in FIG. 5.

The line III means that the total torque Q is maintained constant wherever the head arm 20 swings, and that the direction of the total torque Q causes the head arm 20 to swing toward the second rotational position $P_2$.

Accordingly, the following technical effect is obtained:

(1) Since the direction of the total torque Q causes the head arm 20 to swing toward the second rotational positional position $P_2$, whereupon an emergency state such as unexpected power failure occurs (which makes torque of VCM 21 zero) during R/W mode, the head arm 20 is immediately returned to the second rotational position $P_2$, and the magnetic heads 24 and 25 are thereby returned to the CSS zones 16 and 17 respectively.

Therefore, it becomes possible to prevent the magnetic heads 24 and 25 from coming into adverse contact with the R/W zones 14 and 15 which damages the data recorded in these zones 14 and 15.

(2) Since the total torque Q is made constant over all the swing range of the head arm 20, the bias current being supplied to the VCM 21 will be constant wherever the head arm 20 is positioned, so that the head arm 20 can perform a head seek operation at a predetermined velocity. Therefore, the control operation of the VCM 21 becomes simple.

Moreover, depending on the construction of the magnetic disc apparatus, the strength of the magnetic field inside the yoke 31 and the angles $\alpha_1$ and $\alpha_2$ is determined so that the torque characteristics of the torque imparting device becomes complementary to the torque characteristics of the spindle 22 due to the head arm 20.

FIG. 6 illustrates a second embodiment of the magnetic disc apparatus according to the present invention.

Figures 6A, 6B:
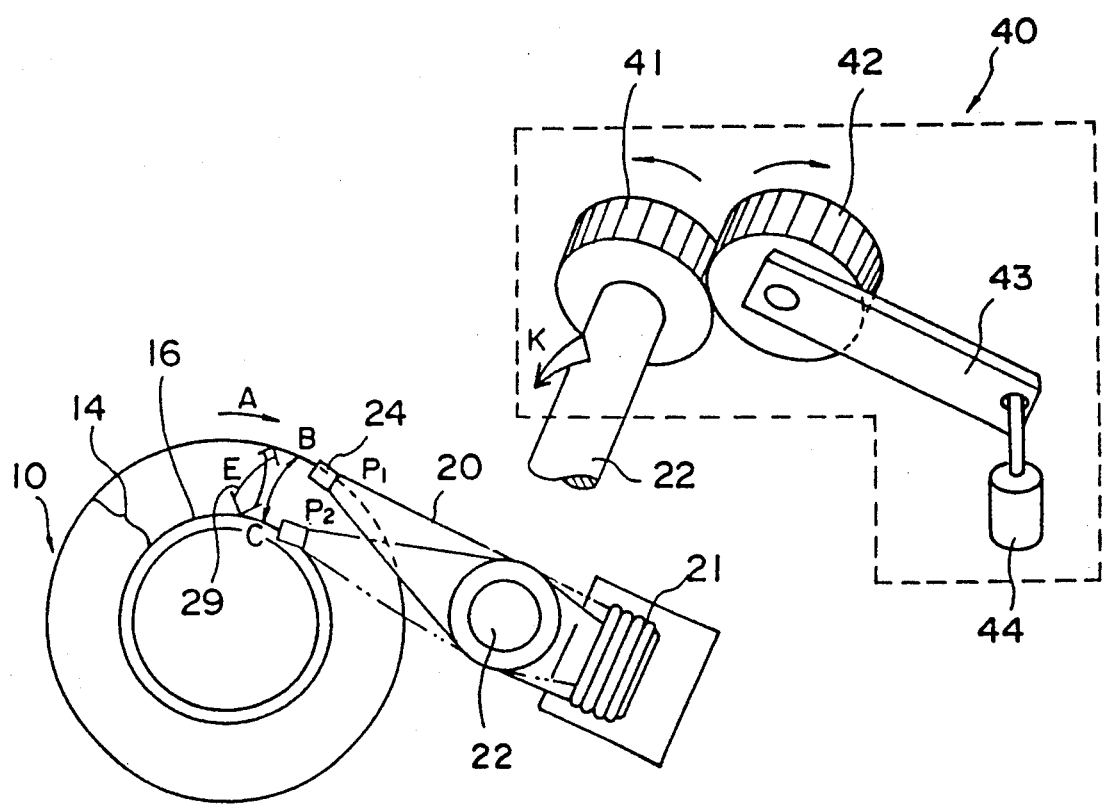
FIG. 6A is a schematic view of a second embodiment of a magnetic disc apparatus according to the present invention.
FIG. 6B is a perspective view of the spindle engaged with a torque imparting device.

In FIGS. 6A and 6B, parts corresponding to parts in FIG. 1 are designated by the same reference numerals and the description thereof is omitted.

A torque imparting device 40 is of a construction which utilizes gravity.

A gear 41 is fixed to the spindle 22. The gear 41 is meshed with a gear 42, to which is mounted an arm 43 having a weight 44 mounted thereon. The arm 43 extends in a direction deviated by 180 degree with respect to the head arm 20.

As the head arm 20 swings toward the second position $P_2$ and the torque U of the head arm 20 thereby increases, the arm 43 turns downward and the torque K generated by the device 40 decreases. The torque K is applied to the head arm 20 so as to turn the head arm 20 toward the CSS zone 16.

On the contrary, as the head arm 20 swings toward the first position $P_1$ and the torque U of the head arm 20 thereby decreases, the arm 43 turns toward a horizontal position and the torque K generated by the device 40 increases.

Accordingly, when the torque U and the torque K are summed up, the total torque becomes constant irrespective of the rotational position of the head arm 20, and is in the direction of C.

Therefore, the control of the VCM 21 can be carried out in a simple manner, and the magnetic head 24 can be returned to the CSS zone 16 when a power failure and the like occurs.

The torque imparting device may be of a construction made of a tension coil spring, a compression coil spring, or a helical spring.

The disposition of the magnetic disc 10 and the head arm 20 is not limited to that disclosed in the embodiment described heretofore, but may instead be in such a disposition wherein, for example, the magnetic disc 10 is horizontal and the head arm swings in a horizontal plane. Moreover, in the apparatus using the magnetic disc having the CSS zone at the outer periphery of the R/W zone, the torque imparting device is adapted so that the total torque on the head arm becomes constant and causes the head arm to swing toward the outer periphery of the magnetic disc.

Further, the present invention is not limited to these embodiments, various variations and modification ay be made without departing from the scope of the present invention.

What is claimed is:

1. A swing arm type magnetic disc apparatus comprising:
   a housing;
   a magnetic disc having a data read and write zone and a contact start stop zone, and being accommodated in said housing and rotating at a high speed;
   a spindle rotatably supported on said housing;
   a head arm provided with a floating-type magnetic head and secured to said spindle; said spindle having an operational torque thereon, which varies in direction depending upon angular position of said head arm and which causes said magnetic head to move toward or away from said contact start stop zone, caused by a moment of forces acting upon said head arm, said operational torque varying in magnitude depending upon the angular position of said head arm;
   complementary torque generation means for generating an imparting torque to said spindle in a manner that said imparting torque is applied in a direction toward said contact start stop zone such that, during a seek operation, said operational torque and said imparting torque together comprising a combined torque which is applied on said spindle, said combined torque being substantially constant regardless of angular position of said head arm; and said combined torque, which is substantially constant, acts in a direction which causes said magnetic head to move toward said contact start stop zone; and
   a motor for driving said spindle when a seek operation is performed for moving said head arm out of said start stop zone and for overcoming said combined torque by means of a generated force produced by said motor.

2. A magnetic disc apparatus as claimed in claim 1, in which said complementary torque generation means comprises:
   a yoke mounted on said housing;
   a pair of permanent magnets disposed to confront each other and mounted on said yoke; and
   an I-shaped rotor mounted on said spindle and accommodated inside said yoke;
   said pair of permanent magnets and said rotor being disposed in a mutual relationship such that a center line of said pair of permanent magnets and a center line of said rotor have an angular deviation so as to impart torque for moving said magnetic head to said contact start stop zone.

3. A magnetic disc apparatus as claimed in claim 1, in which said magnetic disc has said contact start stop zone at an inner periphery of said read and write zone, and is disposed for rotation in a vertical plane;
   said spindle being horizontally disposed;
   said head arm being disposed so that said head arm always has an elevation angle, and the elevation angle of said head arm decreases as said magnetic head moves toward said contact start stop zone; and
   said complementary torque generation means generating an imparting torque which works so as to decrease the elevation angle of said head arm, said imparting torque decreasing as the elevation angle decreases.

4. A magnetic disc apparatus as claimed in claim 1, in which said complementary torque generation means comprises:
   a first gear mounted on said spindle;
   a second gear meshed with said first gear;
   a torque arm secured to said second gear and extending in a direction substantially opposite to said head arm; and
   a weight mounted on said torque arm for imparting torque via said second gear and said first gear to said spindle.

* * * * *